UNITED STATES PATENT OFFICE.

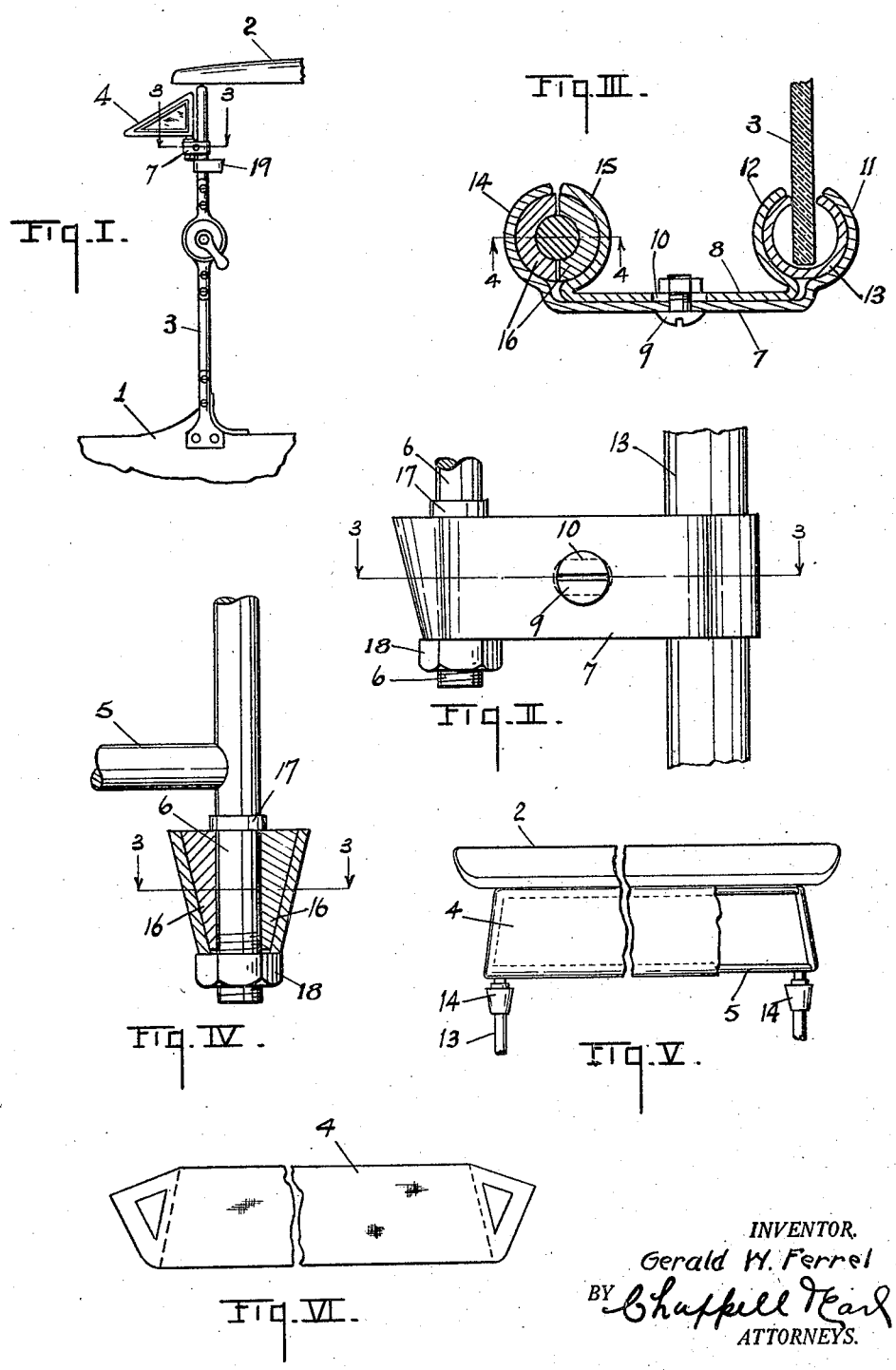

GERALD W. FERREL, OF KALAMAZOO, MICHIGAN.

BRACKET.

1,418,551.   Specification of Letters Patent.   Patented June 6, 1922.

Application filed March 16, 1921. Serial No. 452,689.

*To all whom it may concern:*

Be it known that I, GERALD W. FERREL, a citizen of the United States, residing at the city and county of Kalamazoo, State of Michigan, have invented certain new and useful Improvements in Brackets, of which the following is a specification.

This invention relates to improvements in brackets.

My improved bracket is especially designed by me for securing attachments, such as storm shield, a lamp or the like, to the wind shield of a motor vehicle.

The main object of this invention is to provide an improved bracket for wind shields and the like which is simple and economical in structure and neat and attractive in appearance and one which may be quickly applied and effectively supports an object upon the wind shield of a motor vehicle.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Fig. I is a fragmentary view of a motor vehicle having a storm front embodying the features of my invention mounted thereon.

Fig. II is an enlarged detail side elevation of parts shown in Fig. I.

Fig. III is a horizontal section on a line corresponding to line 3—3 of Figs. I, II and IV.

Fig. IV is a detail view partially in vertical section on a line corresponding to line 4—4 of Fig. III.

Fig. V is a detail front elevation.

Fig. VI is a front view of a storm shield removed from its supporting frame.

In the drawing similar reference characters refer to similar parts throughout the several views, and the sectional views are taken looking in the direction of the little arrows at the ends of the section lines.

Referring to the drawing, 1 represents the body, 2 the top and 3 the wind shield of a motor vehicle.

My improvements are illustrated as I embody them in storm fronts.

The storm front 4 is formed of canvas mounted on a frame 5 having supporting arms 6.

My improved supporting bracket comprises a pair of members 7 and 8, preferably formed as sheet metal stampings, the members being disposed side by side, and a member 7 being provided with a bolt 9 engaging a slot 10 in the member 8.

The bracket members are provided with laterally projecting coacting jaws 11 and 12 adapted to embrace the frame 13 of the wind shield. At their other ends the bracket members are provided with coacting socket members 14 and 15. These socket members are conically shaped or tapered towards one end.

Within the socket members is a clamping block 16, preferably formed of sections, as illustrated. The arm 6 is arranged through this clamping block and provided with a collar 17 engaging the upper end thereof. A nut 18 on the arm engages the lower end of the socket so that by turning up the nut the clamping block is drawn into the socket, the arm 6 clamped to the bracket and the jaws 11 and 12 are clamped upon the wind shield frame or other object on which it is desired to mount the bracket.

I show a second bracket, designated by the numeral 19, which is adapted to receive and support a search lamp or the like.

My improved bracket is very compact and neat in appearance, is very simple and economical to produce and may be quickly applied to wind shields of various styles or differing considerably in structural details.

It will be understood that there is a bracket for each end of the storm shield.

I have illustrated various parts in conventional form as the structural details thereof form no part of this invention. It is believed, however, that the disclosure made will enable those skilled in the art to which my invention relates to apply or adapt my improvements as occasion may require.

Having thus described my invention, what I claim as new and desire to secure by Letters Patent, is:

1. A bracket for wind shields and the like consisting of a pair of bracket members disposed side by side and provided with laterally projecting coacting clamping jaws at one end adapted to engage a support, and laterally projecting coacting tapered socket members at their other ends, one of said bracket members being longitudinally slotted to receive a bolt carried by the other, a split tapered clamping block disposed in said socket, and an arm disposed through said block and provided with a collar engaging its upper end, and with a nut engaging the end of the socket whereby the arm is secured to the bracket and the bracket jaws are clamped upon a support.

2. A bracket consisting of a pair of bracket members disposed side by side and provided with laterally projecting coacting clamping jaws at one end adapted to engage a support, and laterally projecting coacting socket members at their other ends, a clamping block disposed between said socket members, and an arm engaging said clamping block and provided with a nut engaging the socket whereby the arm is secured to the bracket and the bracket jaws are clamped upon a support.

In witness whereof, I have hereunto set my hand and seal in the presence of two witnesses.

GERALD W. FERREL. [L. S.]

Witnesses:
WM. L. FITZGERALD,
L. E. WAGNER.